Inventor
William P. L. Wilby
By Kemon, Palmer, Stewart & Estabrook
Attorneys

Inventor
William P. L. Wilby
By Kemon, Palmer
Stewart & Estabrook
Attorneys

Inventor
William P. L. Wilby
By Kemon, Palmer, Stewart & Estabrook
Attorneys

Feb. 1, 1966 W. P. L. WILBY 3,233,220

CHARACTER IDENTIFICATION MEANS

Filed Jan. 18, 1962 5 Sheets-Sheet 4

Inventor
William P. L. Wilby
By Kemon, Palmer, Stewart & Estabrook
Attorneys

Inventor
William P. L. Wilby
By Kemon, Palmer, Stewart & Estabrook
Attorneys

United States Patent Office
3,233,220
Patented Feb. 1, 1966

3,233,220

CHARACTER IDENTIFICATION MEANS

William Peter Lanham Wilby, London, England, assignor to Crosfield Electronics Limited, a British company Filed Jan. 18, 1962, Ser. No. 167,078
Claims priority, application Great Britain, Jan. 20, 1961, 2,409/61
7 Claims. (Cl. 340—146.3)

This invention relates to the recognition of distinct electrical waveforms, for example waveforms representing printed characters. Such waveforms may be produced, for example, by a coil on a magnetic scanning head with a single gap, traversing a character printed with magnetic ink and which has been previously magnetised. The problem of recognition is complicated by the fact that the waveforms to be recognized are in general not ideal, but are modified by random noise and distortion of various kinds.

It has previously been proposed to sample the waveform to be recognized at a number of instants and to apply at least some of the signals resulting from the sampling to a linear recognition network which will produce a signal for one of the possible characters which is widely different from the signals which will result from the sampling of waveforms representing other characters. This is known as a linear processing, and it has been shown that non-linear processing is more advantageous and that the most general non-linear operation which can be performed on an input signal by a transfer function generator can be expressed in the form:

Output of transfer function generator $O(S)$ $$=\sum_{0}^{N} C_n S_n + \sum_{0}^{N}\sum_{0}^{N} C_{n_1n_2} S_{n_1} S_{n_2} + \sum_{0}^{N}\sum_{0}^{N}\sum_{0}^{N} C_{n_1n_2n_3} S_{n_1} S_{n_2} S_{n_3} + \cdots$$

In this expression, the $S_n$ terms are the signal amplitude samples numbered from zero to N and the $C_n$ terms are associated coefficients. The transfer function generator is optimised for any particular operation by adjusting the coefficients to the most suitable values. The optimum linear transfer function generator for linear processing can be obtained by using only the first term in this equation. Non-linear transfer function generators have not been used in recognition circuits to any great extent, mainly because the electronic equipment needed to synthesize the non-linear terms of the above expression is exceedingly complex. Also non-linear transfer function generators generally have the defect that their action varies with the signal level, and input signals to a recognition network generally vary over a wide amplitude range. It has been widely realised, however, that non-linear transfer function generators, if they could be used for waveform recognition, would have great advantages over linear transfer function generators because of their great "shape perception."

The present invention overcomes the disadvantages of the prior non-linear transfer function generators based on the above equation by using a class of non-linear transfer function generators which does not suffer from the disadvantages mentioned above.

The apparatus according to the present invention includes, in addition to means for sampling the waveform at a number of time-spaced points to provide signals representing the amplitudes and inverted amplitudes of the waveform at these points, maximum or minimum signal selector circuits each receiving a predetermined selection of the sampled signals, a recognition network for each possible waveform and connection to each network such that it receives signals corresponding to one or more of the time-spaced samples of the input waveform and, in opposite or the same polarity, a non-linear signal from one or more of the maximum or minimum signal selector circuits varying with the largest or smallest of the predetermined selection of sampled signals so that the non-linear signal contributes most in the network when all the sampled signals applied to the selector circuit are most negative or most positive, respectively, and decision means adapted to select one of the outputs of the networks which is distinguished from the remaining outputs. It will be seen that with an apparatus embodying the present invention, the complexities of the prior non-linear transfer function generators are avoided by using simple maximum or minimum signal selector circuits instead of analogue circuits for squaring or multiplying. At the same time, the ability to detect the pattern and sequence of distinctive peaks in the waveform is retained. Although in theory the non-linear recognition transfer function generator could be provided with non-linear signals derived from all possible combinations of two samples (which will be termed diads), all possible combinations of three signals (which will be termed triads), and so on, in any practical case most of the coefficients of the diads and triads can be made zero. The coefficients of the remaining terms are adjusted according to a suitable criterion to give optimum recognition of one of a family of waveforms, bearing in mind the shape of the other waveforms and the possible distortion which may occur in the waveforms. A separate operator or combination of terms is used for each waveform and the resulting outputs are compared to determine which is distinguished from all the remaining outputs.

In order that the invention may be better understood, a specific character recognition system embodying the invention will now be described by way of example with reference to the accompanying drawings, in which.

In this example a magnetic reading head 1 scans the characters to be identified and the electric signal generated by this scanning is passed through a constant gain amplifier 2 to a delay line 3 which is divided into twenty sections D1 to D20.

Figure 2:
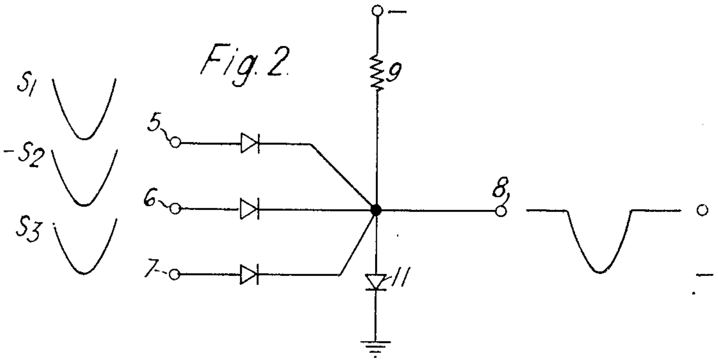
FIGURE 2 is a simplified circuit diagram of a network for detecting the presence of three peaks at predetermined positions in the waveform to be identified.

Sample signals are derived from tapping points between adjacent sections of the delay line 3 and applied to a set of buffer amplifiers B1 to B20, each buffer amplifier having two output terminals. At one of these a signal appears which is in phase with the signal at the tapping point and at the other a signal appears which is inverted with respect to the signal at the tapping point. For each character waveform to be recognised an analogue adding network is provided and, as in the present example the incoming waveform may represent any one of the 10 digits and 4 special characters, there are 14 adding networks including summing amplifiers A1 to A14. Each of these networks receives input signals from a selection of the twenty buffer amplifiers B1 to B20 of which some input signals may be derived from the positive output terminals of the buffer amplifiers and some from the negative output terminals. These signals are applied to the adding circuit through weighting resistors R*w* which are selected to provide the appropriate coefficients for the linear terms represented by the signals from the buffer amplifiers. In addition fourteen triad maximum signal selector networks T1 to T14 are provided, one for each of the characters to be recognised, and each triad network receives signals from three buffer amplifiers. A triad network is shown in FIGURE 2. It comprises three diodes to one side of which three sampled signals from selected buffer amplifiers are applied through input terminals 5, 6 and 7 respectively, the other sides of the diodes being connected to a common resistor 9. The potential of the junction of the diodes and the resistor, and therefore of the output terminal 8, follows the most positive of the input signals when the diodes are connected in the direction shown in FIGURE 2. Thus, the output terminal 8 will have a large negative value only when all of the input signals are large and negative. This output signal which is fed to the adding networks therefore indicates the coincidence of three large negative signals at the corresponding terminals of the buffer amplifiers. It is arranged that the output polarity of the triad output signal is such that it substracts from the output which the summing amplifier of the adding network would produce to represent the sum of the linear signals.

Figure 3:
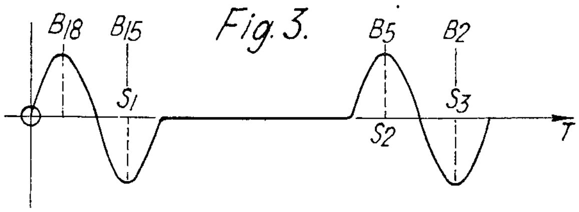
FIGURE 3 is a waveform diagram resulting from scanning a particular character to be recognized.

The waveform resulting from scanning the character representing the digit zero is shown, by way of example, in FIGURE 3. The waveform is shown with time increasing positively along the abscissal axis and, therefore, at the instant of sampling, which is determined in a way yet to be described, the waveform illustrated is distributed along the delay line 3 so that the voltages applied to the buffer amplifiers B2 and B15 from the second and fifteenth tapping points on the delay line 3 respectively represent the two negative peaks of the waveform and the voltages applied from the fifth and eighteenth tapping points to the buffer amplifiers B5 and B18 respectively represent the two positive peaks, the leading edge of the waveform being shown at the origin of the diagram in FIGURE 3. The voltages from the remaining tapping points represent intermediate points on the waveform and are applied to the remaining buffer amplifiers. The signals from the outputs of buffer amplifiers B2 and B15 which are in phase with the inputs to the buffer amplifiers from the second and fifteenth tapping points on the delay line are fed to the tenth triad network T10 together with the signal from the fifth buffer amplifier which is inverted with respect to its input. These connections ensure that this tenth triad network provides a large negative signal only when a waveform having large negative values at the second and fifteenth tapping points and a large positive value at the fifth tapping point is present in the delay line at the moment of sampling. These conditions exist when a zero character has been scanned as has been shown but do not exist when any other of the characters to be recognised are scanned; therefore, normally the tenth triad network T10 will only have a large negative output signal when a zero character has been scanned. The output polarity of the triad output signal is such that when applied to an adding amplifier it substracts from the output which the adding amplifier would produce, without the triad signal, to represent the sum of the linear signals from the selection of tapping points to which the amplifier is connected.

Assuming now that the triad network shown in FIGURE 2 is that which detects the existence of a triad characteristic of an incoming zero waveform, the input terminals 5, 6 and 7 are connected to the outputs of the buffer amplifiers B2, B5 and B15 respectively as described, and the output at terminal 8 follows the most positive of the signals applied to the input terminals 5, 6 or 7 but, owing to the leakage path to earth through the additional diode 11, never becomes positive itself. The output signal is, therefore, large and negative only when three large negative signals are received at its input terminals, that is when a waveform resulting from the scanning of a zero is present in the delay line at the instant of sampling.

Each summing amplifier A1 to A14 therefore provides an output signal which represents the sum of all the linear signals which are applied to it from the buffer amplifiers B1 to B20, after weighting, together with a selection of the outputs of the triad networks which discriminates against other possible waveforms. By suitable adjustment of the coefficients, it can be ensured that for each of the fourteen input waveforms, only one of the fourteen adding networks will produce a large negative output, all other adding networks giving positive outputs. If the input signal in the delay line is grossly distorted then it is possible for more than one adding network to give a negative output. It must then be decided which output is the correct output or that the recognition is unreliable in which case a reject must be signalled. This decision process is effected by feeding the output of each summing amplifier back to the input terminals of all the other adding networks with suitable coefficients, set by the ratio $$\frac{Rf}{Rd}=k$$

(where R*f* is the value of the resistance in the feedback circuit between the output and input of a given summing amplifier and R*d* is the value of the resistance in the connection between the output of any other summing amplifier and the input of the given summing amplifier). It can then be shown that the output of the given summing amplifier is given by the expression:

$$O_1=-\left[\frac{V_1[1+(n-2)k]-k\sum_{2}^{n}v}{1+(n-2)k-(n-1)k^2}\right]$$

In the above expression $-V_1$ is the output of the summing amplifier being considered with the decision feedback circuits disconnected, $\Sigma v$ is the sum of the outputs of all the other summing amplifiers before the feedback is applied, and $n$ is the number of adders. It will be seen that if $k=\frac{1}{2}$ and if the amplifiers are designed so that they only give unidirectional outputs, then all final outputs from adding networks which would have an original output signal before feedback less than 50% of the original output before feedback of any one of the other summing amplifiers are automatically suppressed. The decision feedback therefore improves the recognition and also acts as a decision unit since it ensures that the output terminal of only one adding network normally carries a signal and this defines the character waveform present in the delay line. If there is an output signal from more than one summing amplifier this means that the original output (before feedback) from the second was more than 50% of the original output (before feedback) from the first.

The outputs of the summing amplifiers are only sampled when the character waveform completely fills the delay line since at other times misleading outputs will occur. This is achieved using "and" gates *g* (FIGURE 1) which receive a pulse at the appropriate moment from a precise trigger unit to be described below. The sampled outputs from the summing amplifiers are passed through pulse-shaping circuits *p* to the output terminals 21 of the system and also to a reject network 10. The reject circuit comprises fourteen similar parallel input circuits, one from each of the pulse-shaping circuits *p*, connected to the base of a germanium transistor. Each input circuit includes a silicon diode connected in series with a resistor, the values of the resistors in all the input circuits being equal. The germanium transistor is biased so that an input pulse in only one of its input circuits (that is, from only one of the adding networks) is not sufficient to render it conductive but simultaneous input pulses from two or more of the adding networks are sufficient. In this way it is arranged that a pulsed signal appears at the collector of the germanium transistor whenever more than one pulse is applied to the reject circuit from the adding networks at the instant of sampling to indicate that the recognition of the character just scanned is ambiguous and that the result is rejected. If only one input pulse is received by the reject circuit no output pulse appears at the collector of the transistor and the character scanned is recognised by observing the output terminal 21 of the recognition system at which a negative-going pulse appears on sampling. In the case described unreliable recognition is registered by the reject circuit if an output signal from any one of the summing amplifiers before feedback would have been more than 50% of the value of a similar output signal before feedback from any other of the amplifiers but the value of this percentage can be adjusted by varying the values of the feedback resistors R*d* and R*f* to give any other reject level if desired.

A further factor affecting the choice of coefficients, which are represented by the weighting resistors R*w* through which the signals from the tapping points of the delay line are fed to the summing amplifiers, is the extent to which the recognition is affected by a small shift in the nominal triggering position of the waveform, that is to say in the position of the waveform in the delay line at the sampling instant. To ensure that this shift is as small as possible a very precise trigger network is employed. The chief cause of variation in the triggering instant is variation due to changes in amplitude of the incoming signals. This is eliminated by scaling the first peak of the waveform to a chosen size before feeding it to the trigger network 12 (FIGURE 1), using an automatic gain control system 13. An "early warning" signal is generated in the trigger circuit 14 when the first peak passes the fourth tapping point of the delay line while the leading edge of the waveform is still a suitable distance from the end of the delay line 3. This enables a condenser in the peak level detector 15 to charge up to the peak voltage of the first positive peak in the waveform. This voltage level is then held and used to set the gain of the automatic gain control system 13. A signal is taken from the seventeenth tapping point on the delay line and fed through the automatic gain control system 13. By the time the first peak enters the A.G.C. system the gain of that system has been adjusted with reference to the voltage held in the peak level detector so that the first peak is a standard size after passing through it, and during its passage through the branch section 16 of the delay line 3. For simplicity in FIGURE 1 the signals applied to the early warning trigger circuit 14, the peak level detector circuit 15 and the automatic gain control system 13 have been shown as being taken directly from the fourth and seventeenth tapping points of the delay line 3 respectively but, since the leading peak of the waveforms resulting from scanning the characters to be identified are positive, in order to simplify the design of these subsequent circuits, the input signals applied to them are in fact taken from the output terminal of the buffer amplifiers connected to the fourth and seventeenth tapping points of the delay line 3 which carry signals in anti-phase with the signals actually appearing in the delay line. The input signals to the early warning trigger circuit 14, the peak level detector 15 and the automatic gain control circuit 13 are therefore negative-going pulses.

Figure 4:
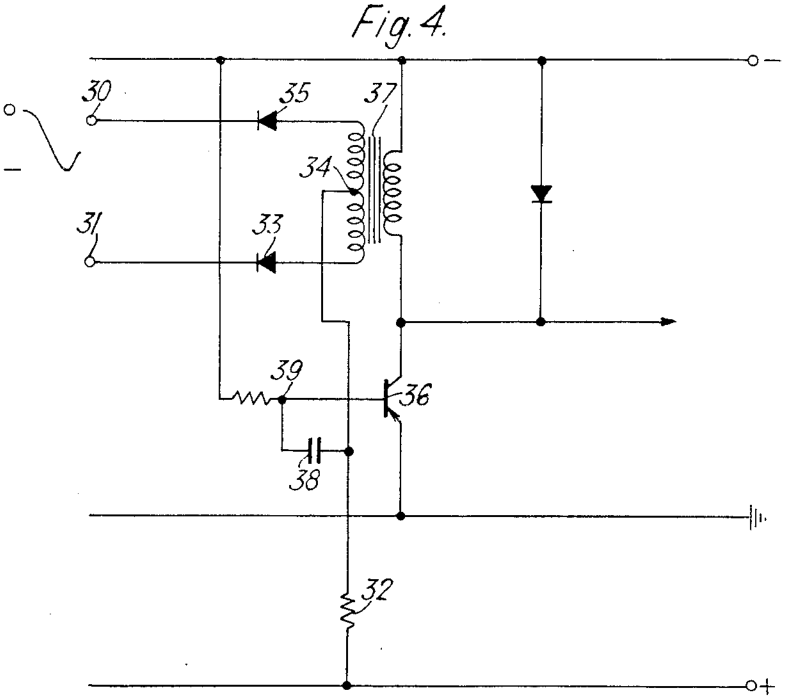
FIGURE 4 is a circuit diagram of the early warning trigger circuit shown in block form in FIGURE 1.

The early warning trigger circuit is shown in FIGURE 4 and will now be described. It is based on a blocking oscillator comparator circuit similar to the "multiar" valve circuit. The input voltage which is negative-going from the buffer amplifier connected to the fourth tapping point of the delay line is applied at terminal 30. A negative reference level signal is applied at terminal 31. Current flows from the positive supply through resistor 32 and diode 33 which clamps point 34 at a voltage equal to the reference voltage. Initially point 30 is at earth potential and the diode 35 is therefore reverse biased. There is a feedback from collector to base of transistor 36 through the coupling transformer 37, and it is arranged that this feedback is negative when diode 33 is conducting and positive when diode 35 is conducting. Point 30 on receiving a negative input signal becomes more and more negative until it becomes slightly more negative than point 31 held at a negative reference potential. Diode 33 is then cut off and diode 35 conducts, allowing positive feedback between collector and base of the transistor 36. This causes the transistor 36 to switch regeneratively as a blocking oscillator. The circuit is designed so that only one output pulse is obtained for each waveform passing through the delay line. The point at which the circuit triggers may be adjusted by varying the reference voltage at point 31.

Figure 5:
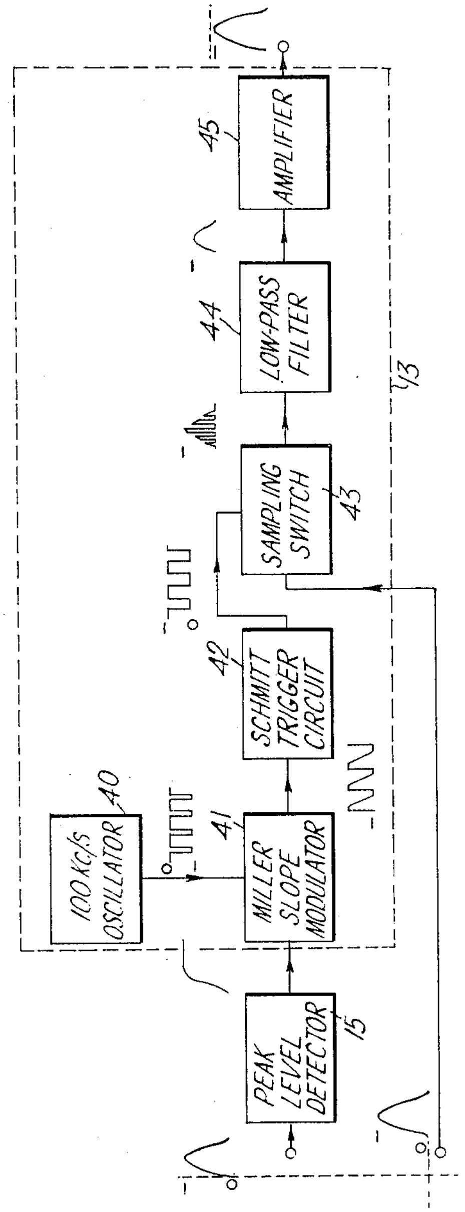
FIGURE 5 is an amplified block diagram of the automatic gain control system shown in FIGURE 1.

The peak level detector circuit 15 and the automatic gain control circuit 13 of FIGURE 1 are shown again in FIGURE 5 and their operation to control the amplitude of the first peak of a waveform in the delay line 3 to be applied to the final trigger circuit 12 will now be described with reference to the waveform diagrams in FIGURE 6. The top line shows two typical first peaks of waveforms entering the delay line 3, the one on the left having a higher maximum voltage than the ideal and the one on the right a lower. It is required that the gates *g* in the output circuits of the summing amplifiers A1 to A14 should pass the output signals from the adding networks when the waveform to be identified is at a given position in the delay line which is substantially independent of the amplitude of the first peak of the waveform. The early trigger pulses generated by the trigger circuit 14 on the reception of the first peaks of the respective waveforms are indicated in the second line of FIGURE 6 and the maximum voltage to which the capacitor in the peak level detector 15 is charged is indicated in line three.

Figure 1:
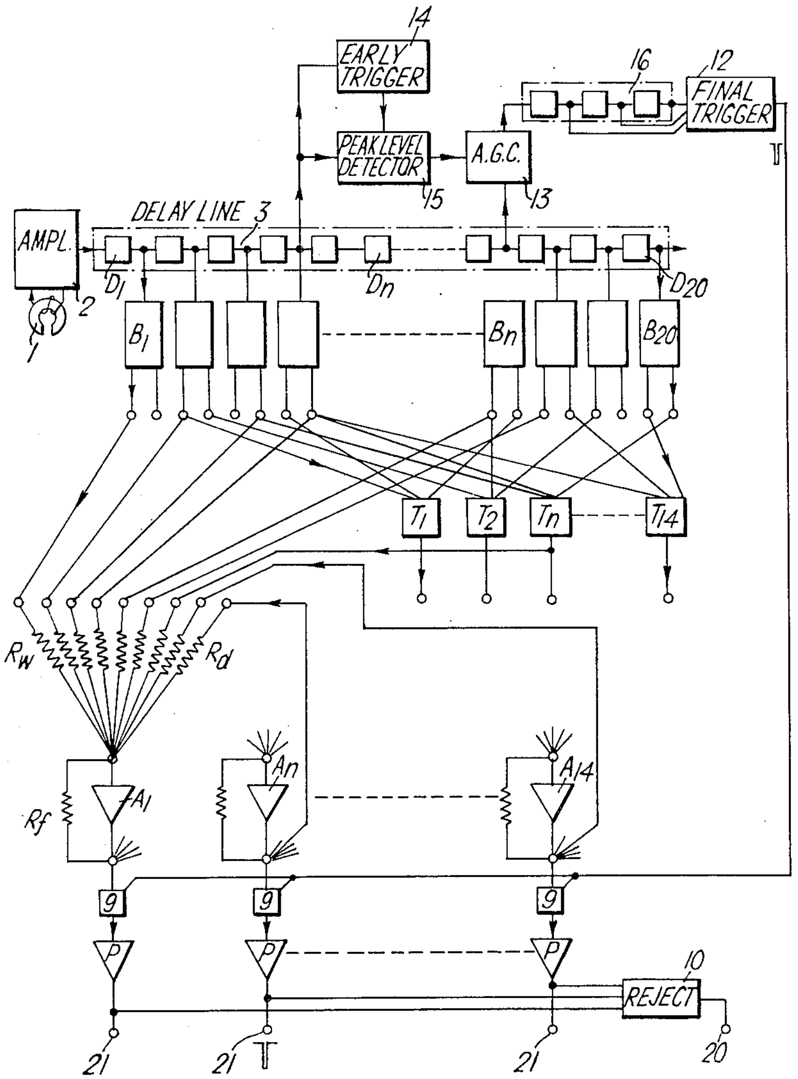
FIGURE 1 is a block diagram showing the interconnection of the various electrical units in a character recognition system embodying the invention.
Figure 6:
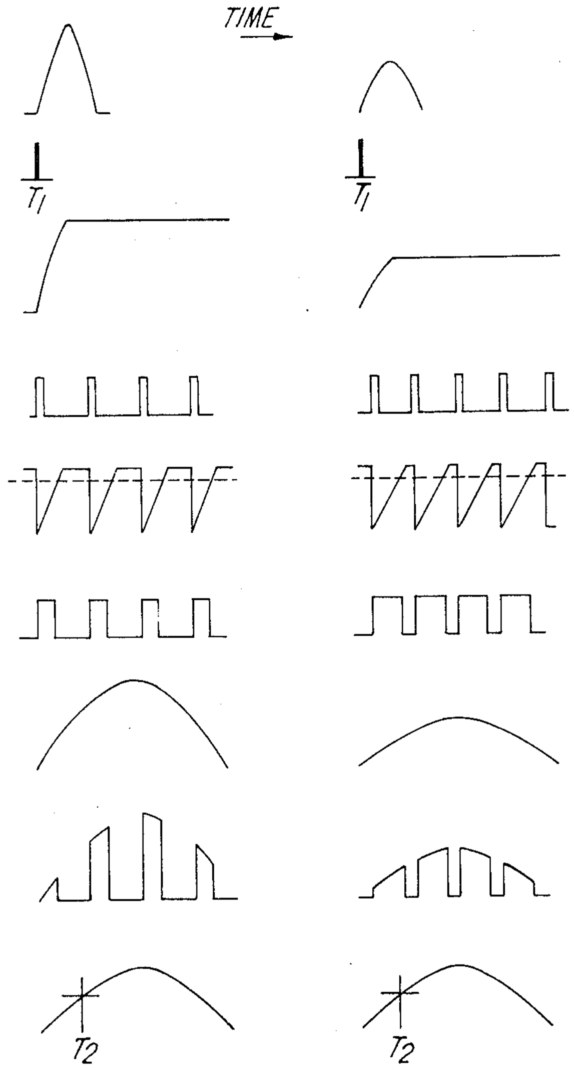
FIGURE 6 is a waveform diagram to assist in the explanation of the operation of the automatic gain control system of FIGURE 5.

A blocking oscillator 40 produces pulses at a 100 kc./s. rate and these are used to reset a Miller integrator circuit 41 which receives as an input voltage the output voltage of the peak level detector 15 indicated in the third line of FIGURE 6. The outputs of the blocking oscillator 40 and the Miller integrator 41 are shown respectively in lines 4 and 5 of FIGURE 6. The greater the voltage, the greater the slope of the output waveform of the Miller integrator. The waveform from the Miller integrator 41 is fed to a Schmitt trigger circuit 42 which generates rectangular pulses from it (shown in line 6 of FIGURE 6) whose width is inversely proportional to the peak voltage of the incoming character waveform. These are fed to a sampling switch 43 which samples the incoming waveform, which is shown on an expanded scale in the next line of FIGURE 6. The sampled waveform (the eighth line of FIGURE 6) is then passed through a low-pass filter 44 which removes the high frequency components and leaves only the frequency components present in the original waveform. The output from the low-pass filter (bottom line of FIGURE 6) has the same shape as the input waveform to the sampling circuit but is scaled to a precise level, since the width of the sampling pulse has been determined by the original peak level. The rate of sampling is much greater than that indicated in FIGURE 6 which is purely diagrammatic. The waveform from the low-pass filter is fed through an amplifier 45 to the branch section 16 of the delay line in three sections and is used in the generation of a precisely timed trigger pulse from the trigger circuit 12 (FIGURE 1).

Figure 7:
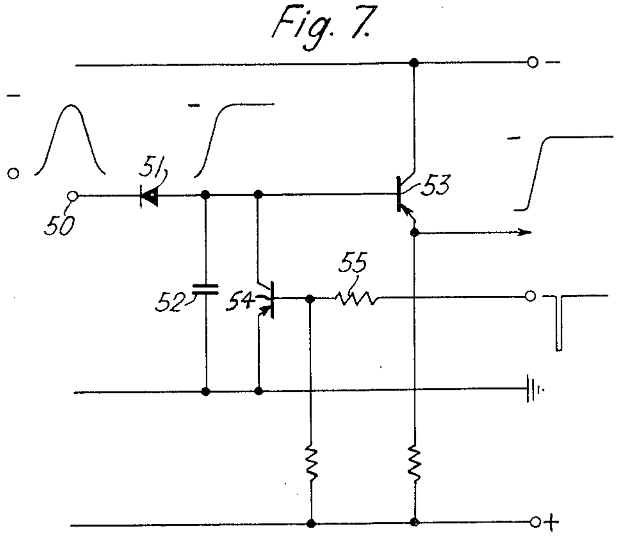
FIGURES 7 and 8 are circuit diagrams of peak level detector circuit and the Miller slope modulator circuit respectively, shown in block form in FIGURE 5.

The individual circuits shown in block form in FIGURE 5 will now be described briefly. FIGURE 7 is a circuit diagram of the peak level detector circuit 15. When the first peak of the character waveform is applied to the input terminal 50, diode 51 conducts charging condenser 52 to a voltage equal to the peak voltage. When the input voltage at terminal 50 falls below the peak level diode 51 is reverse biased and condenser 52 stores the value of the peak voltage. The output voltage of the circuit is taken from the condenser 52 through transistor 53 which is connected as an emitter follower to transistor 54 which is connected across the condenser 52. The input impedance of emitter follower transistor 53 is sufficiently high for the condenser not to be discharged during a time equal to the length of the character waveform. Transistor 54, which is connected across the condenser, is normally biased out of conduction. When it is required to reset the circuit, transistor 54 is switched hard-on by a negative pulse applied to its base through resistor 55 from the early warning trigger circuit 14. This discharges the condenser 52 so that the base of transistor 53 returns to earth potential. The voltage level obtained from the emitter of transistor 53 is used to adjust the gain of the A.G.C. system 13 anew for each character waveform entering the delay line, and this voltage is fed to one of the input circuits of the Miller integrator slope modulator 41.

Another input to the slope modulator 41 is a 100 kc./s. pulse train obtained from a free-running blocking oscillator 40 which is of conventional design.

Figure 8:
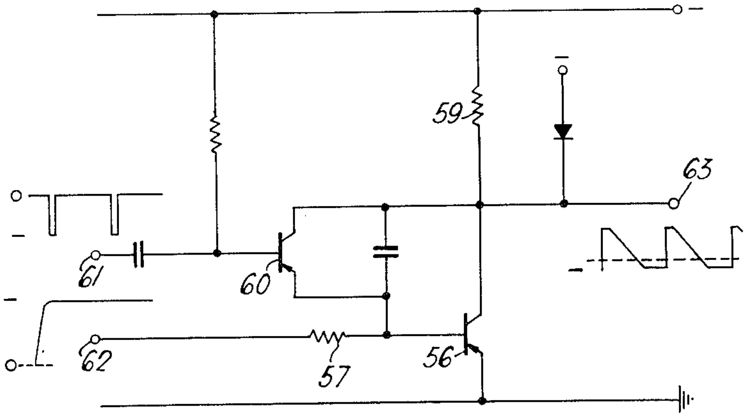

The slope modulator 41 is shown in FIGURE 8. Transistor 56 forms the Miller integrator together with resistor 57, condenser 58 and load resistor 59. The circuit is repeatedly reset at 100 kc./s. by transistor 60 which discharges condenser 58 each time it receives a pulse from the blocking oscillator 40 at terminal 61. In the interval between successive pulses, condenser 58 charges at a rate determined by the voltage applied to input terminal 62 from the peak level detector circuit 15. The duration of the run-down of the output signal of this circuit at terminal 63 is thus inversely proportional to the voltage from the peak level detector 15 applied to terminal 62.

A rectangular pulse inversely proportional to the amplitude of the leading peak of the input waveform in the delay line 3 represented by the voltage at point 67 in FIGURE 8 is required for sampling the input peak of this waveform and this is achieved by feeding the waveform from the Miller slope modulator circuit 41 to a Schmitt trigger circuit 42 of conventional design. The base of the first transistor of the Schmitt trigger circuit is initially at earth potential while the second transistor is conducting, and the voltage developed across the biasing resistor of the transistors then keeps the first transistor in its cut-off state. The voltage at the input terminal connected to the base of the first transistor becomes progressively more negative during the Miller run-down and at a predetermined voltage the first transistor will begin to conduct, and the feedback connection will then cause the second transistor to stop conducting. When the voltage at the input terminal of the Schmitt trigger circuit returns to zero during the next blocking oscillator pulse, the circuit will revert to its original state with the first transistor cut-off and the second conducting. The width of the output pulse obtained from the collector of the second transistor will therefore be inversely proportional to the voltage from the peak level detector 15.

The pulse from the Schmitt trigger circuit is used to sample the first peak of the character waveform in a sampling circuit 43 which comprises a symmetrical transistor arranged to receive the Schmitt waveform at its base electrode to cause it to conduct heavily. During conduction of the transistor the sampled output waveform shown in the eighth line of FIGURE 6 appears across a load resistor connected between the remaining transistor electrode and earth. In the interval between pulses from the trigger circuit the transistor is cut off and no voltage appears across the load resistor. An output waveform similar to that shown is therefore produced in which the width of the sampled portions is inversely proportional to the amplitude of the waveform peak from detector circuit 15.

The sampled waveform is then passed through a conventional low-pass filter 44 to remove the high frequency components and this results in a waveform similar in shape to the original but scaled to a precise level, since the low-pass filter 44 effectively integrates the area of the sampled portions of the waveform, and the height of these portions is proportional to the amplitude of the waveform whereas the width is inversely proportional to this amplitude so that the product of the two is a constant.

The final precise trigger circuit 12 is similar to the early warning trigger circuit 14 shown in FIGURE 4, except that it receives input signals from the tapping points between successive sections and at the end of the branch section 16 of the delay line, as shown in FIGURE 1. The sensitivity of the circuit is set so that it cannot trigger unless tapping points between the first and second, and second and third sections, respectively, have on them negative voltages of a suitable value. This is done by arranging the three input terminals corresponding to terminal 30 in FIGURE 4 at one end of each of three separate input windings on the core of transformer 37. The opposite ends of the three windings correspond to terminal 31 in FIGURE 4 and are held at a negative reference voltage. A tapping point on each winding (corresponding to point 34 in FIGURE 4) is connected through a condenser, such as condenser 38, to point 39 at the base of transistor 36. Positive feedback of transistor 30 is then only possible when all three diodes corresponding to diode 33 are reverse biased. The two extra inputs therefore inhibit the trigger circuit unless a waveform peak of suitable amplitude is found in the branch delay line, enabling the remaining input to trigger with a resolution of a few millivolts in a precise position on the wave front of the scaled character waveform. It is thus arranged that the final trigger pulse from trigger circuit 12 occurs when the voltage at the end of the branch section 16 is more negative than the preset reference voltage. In practice this triggering point is set half-way along the first flank of the first peak of the modified waveforms shown in the last line of FIGURE 6. The instant at which the circuit triggers is then very precise and is relatively unaffected by stray noise or raggedness in the printed character edge. Changes in the amplitude of the incoming waveform to the delay line do not substantially affect the triggering instant.

In the case of an unambiguous recognition of a waveform representing a character, when the triggering pulse from the final trigger opens the electronic gating circuits *g* in the output circuits of all the summing amplifiers A1 to A14 included in the analogue adding networks, a large negative signal will be passed by one of the gates and the output signals from all the other adding networks will be automatically suppressed. The output signal is passed through a pulse-shaping circuit *p* and applied to the one of the fourteen output terminals of the recognition system which is associated with the adding network by which it was generated and which is thus indicative of the character which provided that particular waveform on being scanned by the magnetic scanning head 1.

In cases of uncertain recognition, as has been described, output signals are passed by the electronic gating circuits *g* associated with more than one of the summing amplifiers A1 to A14. The signals from all the gates *g* after passing through their associated shaping networks *p* are fed to the reject circuit 10 in addition to being fed to their respective output terminals. If the reject circuit 10 receives more than one input signal it applies an output signal to terminal 20 which indicates that the recognition of the character scanned was uncertain.

I claim:

1. Character recognition apparatus for identifying to which of a number of known waveform shapes a waveform to be identified corresponds, comprising:

means for sampling the waveform to be identified at a number of time spaced points to provide signals representing the amplitudes and inverted amplitudes of the waveform at these points;

a number of recognition networks each associated with a different one of the known waveform shapes;

at least one signal selector circuit associated with each known waveform shape comprising a plurality of unidirectional conducting paths connected at one end to different ones of said time spaced points and connected at the other end to a common junction of said paths, a grounded unidirectional conducting device connected to said paths at said junction, and a reference potential at said common junction, said signal selector circuit providing an output signal at said common junction which is directly proportional to a selected one of the input signals on said plurality of conducting paths;

means for applying to each recognition network the output signals from one or more of the selector circuits and signals derived from a predetermined selection of the time spaced points, the recognition network being so constructed and arranged that the recognition network associated with the known waveform shape corresponding to the waveform to be identified provides an output signal which differs markedly from the output signals of the remaining networks;

and further comprising decision means for selecting that one of the output signals from the recognition networks which differs markedly from the remaining output signals.

2. Apparatus according to claim 1 wherein said decision means includes circuit means connected to said recognition networks for indicating uncertain recognition of the character to be recognized if the magnitude of the largest output signal is not more than a predetermined percentage greater than the output signal from any one of the other recognition networks.

3. Apparatus according to claim 2 wherein each of said recognition networks includes a summing amplifier having unidirectional output and said decision means includes first feedback means connected between the output and input of each summing amplifier, and second feedback means connected between the output of each summing amplifier and the inputs of all other recognition networks for suppressing the output of all amplifiers that would, in the absence of feedback, have had outputs less than a fixed percentage of the similar output of any one of the remaining amplifiers.

4. Apparatus according to claim 1 wherein said means for sampling the waveform to be identified includes:

a first delay line having a plurality of outputs to which said recognition networks and said signal selector circuits are connected;

switches in the output circuits of said recognition networks;

and means for actuating said switches when said waveform is distributed along a predetermined portion of said delay line.

5. Apparatus according to claim 4 where said means for actuating said switches includes:

a branch section of a delay line connected in parallel with and to said delay line of said sampling means near the end portion thereof;

means for automatically controlling the amplitude of the waveform in said branch section of the delay line;

and means responsive to the instantaneous amplitude of the waveform at a given point in said branch section of the delay line for actuating said switches so that they are actuated when the waveform is distributed along a predetermined portion of said delay line of said sampling means substantially independently of the amplitude of the waveform resulting from scanning.

6. Apparatus according to claim 5 wherein said means for automatically controlling the amplitude of the waveform in said branch section of the delay line includes:

amplitude responsive means connected to said delay line of said sampling means for detecting the amplitude of the leading peak of the waveform entering said delay line of said sampling means;

and means connected to and controlled by said amplitude responsive means and connected to said delay line of said sampling means for automatically adjusting the amplitude of the waveform in said branch section of the delay line.

7. Apparatus according to claim 5 wherein said means for actuating said switches includes a trigger responsive to the instantaneous amplitudes of the amplitude controlled waveform in said branch section of the delay line at more than one point for operating said switches.

References Cited by the Examiner

UNITED STATES PATENTS

| | | | |
|---|---|---|---|
| 2,294,812 | 2/1960 | Merritt | 340—149 |
| 3,016,518 | 1/1962 | Taylor | 340—146.3 |
| 3,103,646 | 9/1963 | Shaeffer | 340—146.3 |

MALCOLM A. MORRISON, *Primary Examiner.*

J. S. IANDIORIO, J. E. SMITH, *Assistant Examiners.*